(12) United States Patent
Morgan

(10) Patent No.: US 6,973,872 B2
(45) Date of Patent: Dec. 13, 2005

(54) INDIVIDUAL DOME MOLDS AND BAKING ASSEMBLY

(76) Inventor: Fletcher Morgan, 4990 Coquina Key Dr., SE., St. Petersburg, FL (US) 33705

( * ) Notice: Subject to any disclaimer, the term of this patent is extended or adjusted under 35 U.S.C. 154(b) by 182 days.

(21) Appl. No.: 10/365,422

(22) Filed: Feb. 13, 2003

(65) Prior Publication Data

US 2004/0094043 A1    May 20, 2004

Related U.S. Application Data

(63) Continuation-in-part of application No. 10/302,903, filed on Nov. 25, 2002, and a continuation-in-part of application No. 10/330,221, filed on Dec. 30, 2002, and a continuation-in-part of application No. 10/294,676, filed on Nov. 15, 2002.

(51) Int. Cl.[7] .......................... A47J 43/18; A22C 7/00; A23P 1/00
(52) U.S. Cl. .............................. 99/439; 99/428; 99/449
(58) Field of Search .......................... 99/439, 428, 432, 99/353, 449, 448; 249/144, 163, DIG. 1

(56) References Cited

U.S. PATENT DOCUMENTS

| | | |
|---|---|---|
| 1,487,906 A | 3/1924 | White et al. |
| 1,852,966 A | 4/1932 | Green |
| 3,141,400 A | 7/1964 | Powers |
| 3,296,956 A * | 1/1967 | Turner .......................... 99/439 |
| 3,831,507 A | 8/1974 | Wheaton |
| 4,220,134 A * | 9/1980 | Snyder .................... 126/390.1 |
| 4,812,323 A | 3/1989 | Savage |
| 5,226,352 A | 7/1993 | Savage |
| 5,232,609 A * | 8/1993 | Prevost et al. .............. 249/102 |
| 5,400,698 A * | 3/1995 | Savage ........................ 99/439 |
| 5,425,527 A * | 6/1995 | Selbak ....................... 249/122 |
| 5,948,313 A | 9/1999 | Cahen |

* cited by examiner

Primary Examiner—Reginald L. Alexander
(74) Attorney, Agent, or Firm—John S. Hale; Gipple & Hale

(57) ABSTRACT

An assembly for forming multiple individual compound desserts in a predetermined dome shape including a first base sheet having a plurality of dome shaped bowls extending therefrom, each dome shaped bowl being formed with a closed semi-spherical end and an open end. A second top sheet is seated on the first base sheet and is provided with a plurality of dome shaped bowls of a smaller diameter than the bowls of the first base sheet, the bowls of the second sheet being mounted in the first base sheet bowls. Fasteners hold both sheets together to prevent separation caused by the expansion of the baking batter of the dessert.

16 Claims, 4 Drawing Sheets

INDIVIDUAL DOME MOLDS AND BAKING ASSEMBLY

CROSS-REFERENCE TO RELATED APPLICATIONS

This is a continuation-in-part application of U.S. patent application Ser. No. 10/302,903 filed Nov. 25, 2002; U.S. patent application Ser. No. 10/294,676 filed Nov. 15, 2002; and U.S. patent application Ser. No. 10/330,221 filed Dec. 30, 2002.

TECHNICAL FIELD OF THE INVENTION

The present invention relates generally to the field of cake baking and desert molds. More particularly, the present invention concerns an apparatus for baking multiple individual sized domed, semi-spherical or hemispherical cakes or molded desserts having nested concentrically shaped components. The present invention relates to an apparatus assembly for baking multiple shaped individually sized desserts that can be termed a dual domed hemispherical or semi-spherical dome cake and/or combination dessert mold.

The present invention is thus directed toward an apparatus for molding cake batter, ice creams, gelatins or other desserts into multiple units having an outer hemispherical shape with an inner separate mold having a smaller concentric hemispherical shape. The invention particularly concerns a tray assembly having nested trays which are fastened together, each tray having a plurality of domed shaped bowls integrally formed therein which molds and/or bakes a plurality of cakes or desserts, each being in the shape of a hemispherical dome having a second inner composition shaped as a hemispherical dome.

BACKGROUND OF THE INVENTION

Food molds have been used and are well known in the prior art. A common baking pan is a food mold, with an open end, a closed end and a peripheral side wall. The closed end and side wall define a hollow volume that becomes the three-dimensional shape of a food product molded by the baking pan.

Some food pans, such as a baking pan for making angel food cake, have an annular ring shaped with an open end. The hollow volume of the ring is filled with a food composition and then baked. After baking, the pan is inverted to remove the shaped food composition from the open end. Thus, the open end is used to form the bottom of the final food product.

Other food molds have a centrally located indentation at the closed end. With a mold of this type, a first food composition may be placed and formed in the open end and a second food composition may be placed in the complementary shaped indentation at the closed end. This provides an accurate fit for the second filler food composition within the first supporting food composition.

In all baking pans, it is desirable to facilitate the partial escape of moisture from these apparatuses in order to develop a degree of porosity in the final baked product. At the same time, however, the batter must absorb some moisture to prevent excessive dehydration. It therefore becomes necessary to contain the batter at a pressure sufficient to limit the extent to which water is converted to steam, since the batter absorbs steam less easily than water, while allowing for a degree of conversion and escape. The batter must also be contained to prevent the escape of the cake itself due to its expansion during baking.

It can thus be seen that a number of devices have been used in the molding and baking of desserts to obtain molded desserts in a variety of shaped configurations as described in the prior art. However covered dual domed desserts are rare because of the complexity in preparing same. While cakes are commonly referred to in the literature as being domed, in effect this is an occurrence which comes about as the batter expands during baking and does not equate to a hemispherical or semispherical shaped cake.

Historically, it was known in the prior art to bake bread bowls which were semi-spherical loaves of bread into which a cavity was carved for placement of salads or soups. A conventional bread bowl is typically made by forming raw bread dough on the top of a simple inverted bowl which is then placed into the oven for baking. Bread bowls made in this manner often rise from the inverted bowl so that the same presents an uneven appearance, requiring trimming and waste.

Many prior art devices and techniques mold and bake dough of breads, batters of cakes, cookies, and other baked goods into various shapes including containers which may be used to hold other foods. For example, U.S. Pat. No. 4,812,323, issued Mar. 14, 1989, discloses a method for molding and baking cookie dough into a cup shape which can then be used to hold ice cream or other fillings in a similar manner to U.S. Pat. No. 3,296,956, issued Jan. 10, 1967, which also discloses a molding and baking apparatus for the baking of bread dough into a cup-like shape. U.S. Pat. No. 1,487,906, issued Mar. 25, 1924, discloses a pan for baking cake batter into a container shape for holding ice cream.

In U.S. Pat. No. 3,141,400 issued Jul. 21, 1964 a telescoping cake apparatus is disclosed with a center cone assembly which moves upward when the cake batter is baked forming a frustrum conical cake with a conical center cavity. A one piece strip cross link handle is secured to the upper edge of top of the expendable baking section and the cone by staples or the like.

A baked layered product with an apparatus for making same is shown in U.S. Pat. No. 3,831,507, issued Aug. 27, 1974. This baking assembly uses three baking pans to form a cylindrical bunt bowl body and lid which is placed over the body to hold the filling therein.

Similarly U.S. Pat. No. 1,852,966 issued Apr. 5, 1932 is directed toward a baking pan used for baking a cake with a hollow center so that the same can have a filling placed therein. A tapered tubular outer member has a core mold mounted thereon attached to a cover over the top of the tubular outer member.

The use of nested trays for forming shaped multiple individual baked goods is typified by the common muffin tray. Stacked or nesting trays for forming shaped baked goods such as bread are shown in U.S. Pat. No. 5,232,609 issued Aug. 3, 1993.

U.S. Pat. No. 5,948,313, issued Sep. 7, 1999 is directed toward a mold assembly for making a baked edible shell. The mold assembly is constructed of an outer mold shell and an associated inner mold shell, the outer mold shell having a curved main portion with a central opening and an outer rim extending in a plane. The inner mold shell has a curved main portion with a central chimney shaped to pass through the outer mold central opening. The outer mold opening comprises a raised circular rim with an inwardly directed flange. The outer edge of the outer mold shell is formed with a rolled-up rim. When the edible material is being cooked, a metal strip with curved ends is mounted over the rolled rim of the outer shell mold as seen in FIGS. 4 and 5C to hold both mold-shells in relative positions to eliminate expansion of the edible material during cooking.

Another reference, U.S. Pat. No. 5,226,352 issued Jul. 13, 1993 is directed toward a baking assembly which has an outer dome shaped member and an inner dome shaped member as shown in FIGS. 6 and 7. A flange extends outward from the upper edge of the outer dome member to seat the flange extending from the upper edge of the inner dome member. The flanges are held together by a C clamp or other fastening means. The inner dome shaped member is TEFLON® coated on its inside surface and outside surface allowing cake or dough to be baked in the outer dome mold and the inner mold.

Hemispherical shaped or dome cakes having dual composition are popular in Italian dessert cooking and are generally known as "Zuccotto". These cakes are prepared by slicing previously baked sponge cake (Pan di Spagna) into thin, vertical slices, lining the interior of a bowl with plastic wrap and lining the plastic wrap in the bowl with overlapping pieces of the sponge cake slices. The slices of cake are then sprinkled with liquor and the dampened assembly is then covered with a plastic wrap and refrigerated. A center mixture of chocolate or other filling is poured into the cake lined bowl and the bottom or exposed surface of the filling is covered with other slices of cake. The entire cake is allowed to set for a number of hours, preferably overnight, inverted onto a platter and dusted with confectioners sugar. As can be seen, the process for making this cake is quite laborious in time and resources required. It has been found desirable to mold or form desserts or cake into a layered hemispherical or semi-spherical dome shape which can be baked and/or frozen and marketed as a specialized cake shape similar to that of the Italian "Zuccotto" cakes as the same make an elegant presentation.

The present invention also solves the complex construction problems in assembling multiple domed cakes or desserts suitable for individual servings through the use of a tray assembly which orients and seats the bowls of each tray in a concentric relationship with each other.

SUMMARY OF THE INVENTION

The present invention is directed toward an apparatus for simultaneously producing individual dual layered semi-spherical or hemispherical desserts or cakes using two trays with multiple dome shaped bowls formed therein. A top tray is positioned or seated on the bottom tray in a nested fixed position so that the respective bowls are aligned with the bowls of the top tray projecting into the chambers or cavities of the bowls of the bottom tray. The combined cake sections from each of the top and bottom dome shaped bowls of the respective top and bottom trays form a dual semi-spherical or hemispherical configuration. The two trays are fastened together with fasteners to keep the trays in a fixed spaced relationship as the batter expands during the cooking process.

It is an object of the invention to prepare two different composition food products into a single hemispherical shaped foodstuff.

It is another object of the invention to provide a cooking assembly for baking multiple individual uniformly shaped dome shaped cakes with an internal composition of a smaller shape than that of the external shape that is resistant to tilting and rolling.

It is still another object of the invention to provide a cooking assembly which delivers heat energy evenly to all areas of the multiple individual sized cakes.

Yet another object of the invention is to provide a cooking assembly that is easy to use, ruggedized and reliable.

It is a further object of the invention to mold multiple food products made of cake batter or a dessert composition in a desired shape and bake or set the compositions while maintaining heat and pressure at a precise desired level.

It is yet another object of the invention is to provide a cooking assembly which is easily broken into individual components and is easy to clean.

Another object of the invention is to provide a cooking assembly for simultaneously baking multiple food products formed of two hemispherical cakes of different sizes with one cake fitting into a cavity formed during the baking process in the outer cake to produce a plurality of uniform cakes that are predictable and reproducible without size variance.

Still another object of the invention is to provide a cooking assembly that has one or more of the characteristics discussed above but which is relatively simple to use and requires a minimum of cooking skills.

In the accompanying drawings, there is shown illustrative embodiments of the invention from which these and other objectives, novel features and advantages will be readily apparent.

These and other objects, advantages, and novel features of the present invention will become apparent when considered with the teachings contained in the detailed disclosure along with the accompanying drawings.

DETAILED DESCRIPTION OF THE INVENTION

Figure 1:
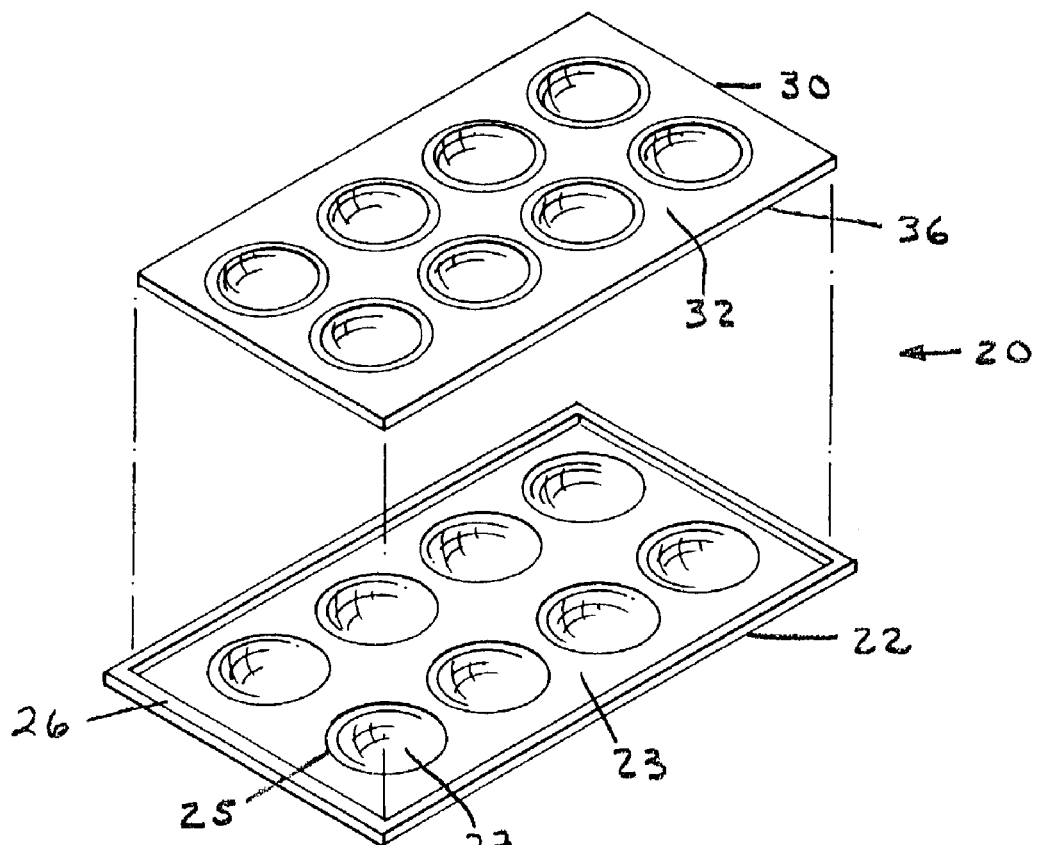
FIG. 1 is an exploded perspective view of the tray components of the present multiple individually sized dome mold assembly.

The preferred embodiment and best mode of the invention is shown in FIGS. 1 through 6. The term "batter" as used herein in the application is meant to encompass cake batter, dough, malleable ice cream, gelatin or a malleable dessert which sets up in a rigid or semi-rigid shape.

Referring to the Figures, a mold baking assembly 20 according to the invention is adapted to shape or mold cake batter for multiple individual dome cakes or other multiple compositions of baking goods or complimentary desserts such as ice cream, gelatins, puddings into a concentric domed layered dessert having a semispherical or hemispherical shape.

The baking assembly 20 is constructed with a bottom rectangularly shaped planar base tray or sheet 22, formed of a planar sheet body 23 having a plurality of recesses or chambers 27 in the form of a dome shape. The dome shaped bowls 24 which form the recesses 27 extend downward from the plane of the tray 22. Each dome bowl or mold 24 is separated from an adjacent dome bowl by planar surface 23 so that the cavity or recess 27 of the mold is spaced to allow entry of the dome bowls 34 of the top tray 30. The tray 22 has an outer seating and indexing lip 26 for the top tray 30 which can take the form of a rolled over arcuate member or an "L" shaped flange. Each of the bowl recesses has a circular opening 25 defined by the bowl body and planar surfaces 23. The bowl body extends below the plane of the planar surface 22 to form a semispherical recess, cavity or chamber 27 which holds the dessert composition.

Figure 6:
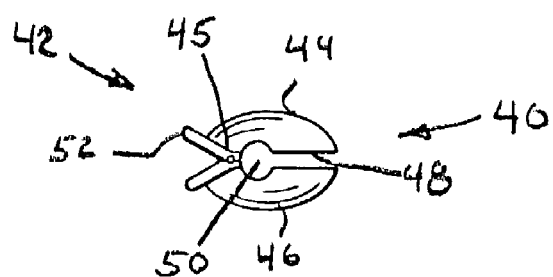
FIG. 6 is an enlarged cross sectional view of a clamp fastener used in the assembly of FIG. 2.

The upper tray or sheet 30 has a planar sheet body 32 with a plurality of dome shaped bowls 34 formed therein. The planar tray is rectangularly shaped and is formed with linear edges 36. The edges 36 are adapted to be seated within and adjacent to the rim or flange 26 of the base tray or sheet 22 so that bowls 34 are orientated and seated in the chambers 27 of the domed bowls 24 of the base tray 22 in a spaced concentric relationship. A fastener 40 in the form of a spring clamp 42 as seen in FIG. 6 can be used to hold the planar surfaces, e.g., the bottom planar surface 33 of the top tray and the top planar surface 23 of the base sheet 22, together during the baking process so that the trays or sheets are not pushed away from each other by expansion of the batter during baking. The baking process forms a domed shaped recess in each of the individual cakes or desserts formed in the base sheet bowls 24.

The spring fasteners have jaws 44 and 46 which are spring biased together by a spring 45 as is well known in the art with a planar jaw surface 48 leading to a circular or shaped rear bore 50. The bore 50 is configured to fit around the lower tray centering lip 26 and the planar jaw surface of jaw 44 engages the top surface 32 of the top tray 30 and the planar surface of the jaw 46 engages the bottom planar surface of the bottom tray. Handles 52 are used to bias the clamp jaws away from each other so that the clamp can fit over the lips.

Figure 2:
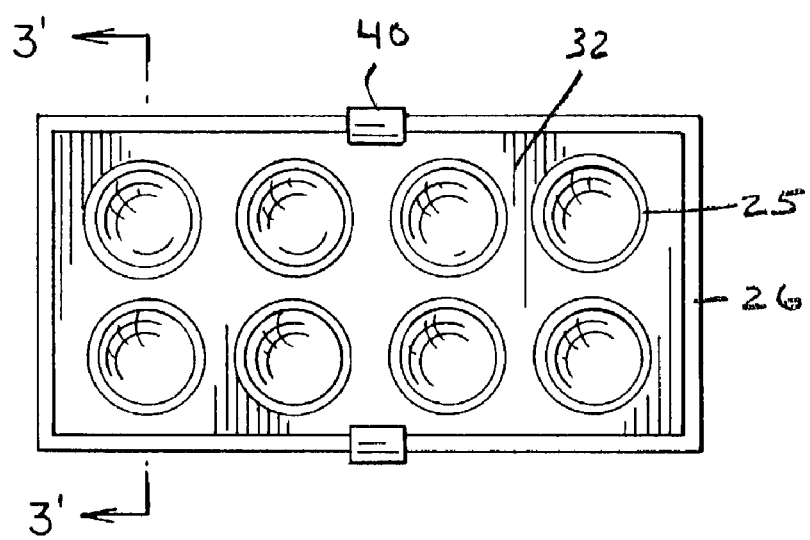
FIG. 2 is a top plan view of the nested trays of the multiple individually sized dome mold assembly of FIG. 1.
Figure 3:
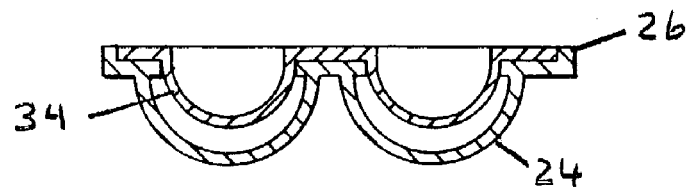
FIG. 3 is an enlarged cross sectional view of the individually sized dome mold assembly taken along line 3'—3' of FIG. 2.
Figure 4:
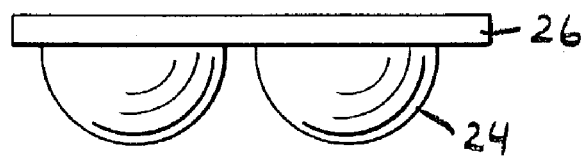
FIG. 4 is a front elevational view of the bottom tray of the assembly of FIG. 1.
Figure 5:
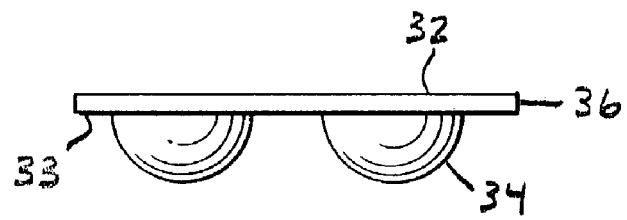
FIG. 5 is a front elevational view of the top tray of the assembly of FIG. 1.
Figure 7:
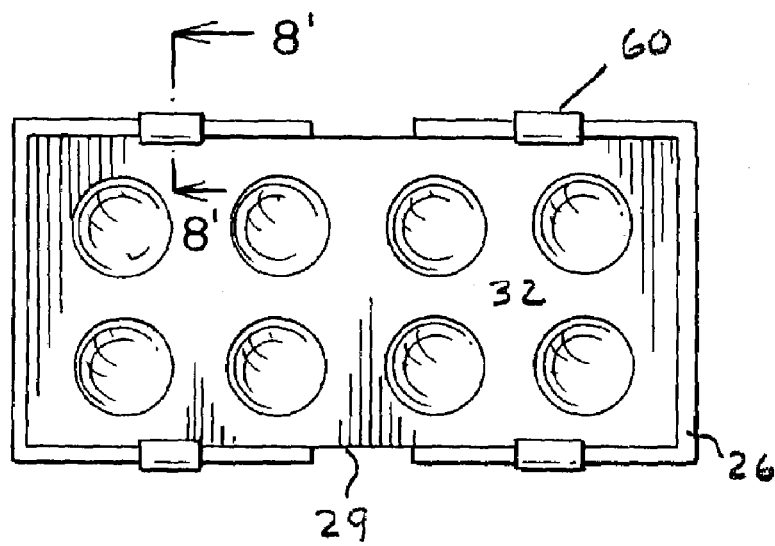
FIG. 7 is another plan view of the multiple individually sized dome mold assembly of FIG. 2 with a side rim portion of the bottom tray removed showing the slide fasteners mounted thereon.
Figure 8:
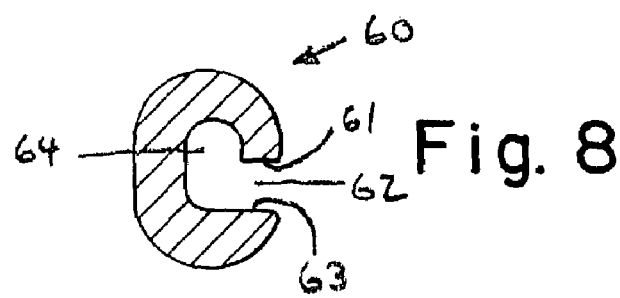
FIG. 8 is an enlarged cross section taken along line 8'—8' of the slide fastener of FIG. 7.
Figure 9:
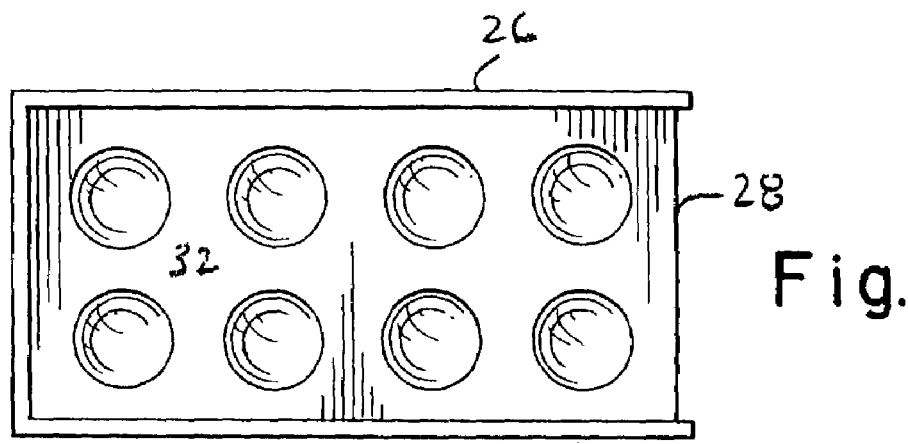
FIG. 9 is another plan view of the multiple individually sized dome mold assembly of FIG. 2 with an end rim portion of the bottom tray removed using the slide fasteners of FIG. 8.

While the lip 26 is shown in FIGS. 2 and 4 as extending around the periphery of the tray 22, one end of tray 22 can have a lip removed as shown in FIG. 9 as indicated by numeral 28. Alternately, a portion or portions of the rim can be removed as shown in FIG. 7 as indicated by the numeral 29. As shown in FIG. 8, a slide fastener 60 is used with the tray shown in FIGS. 7 and 9. The slide fastener 60 has a slot 62 which leads into a channel 64. The slide fastener 60 is inserted on section 28 or 29 with planar surface 63 engaging the bottom surface of the base tray 22 and planar surface 61 engaging the top surface of the top tray 30 with channel 64 encompassing lip 28. The side member 60 is slid along the nested trays to a determined position which can be marked on the lip 28 to hold the trays in a fastened position.

Figure 10:
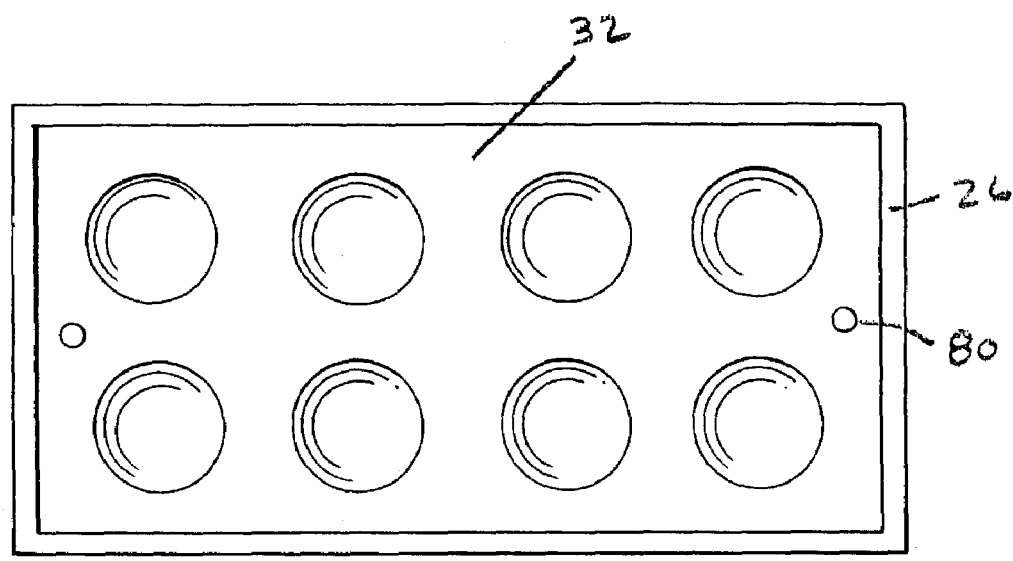
FIG. 10 is a top plan view of the multiple individually sized dome mold assembly of FIG. 2 using another fastener construction.
Figure 11:
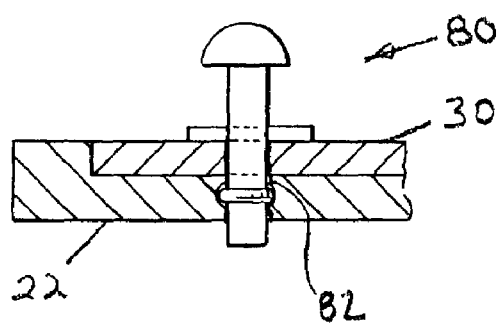
FIG. 11 is an enlarged cross section of the fastener of FIG. 10.

As seen in FIGS. 10 and 11, a pin type fastener 80 can be snap fit through bores 82 cut in the planar surfaces of trays 22 and 30 to hold the same together during the baking process.

Both sheets or trays are preferably constructed of integrally constructed of sheet steel or stainless steel but can be constructed of copper, aluminum, cast iron, pyrex, glass, porcelain, ceramic or any type of microwaveable material at a uniform desired thickness commonly used for baking pans and containers. If desired, the bowl body can have its external surface coated with a non-corroding material such as tin or chromium. The trays and their respective bowls therefore may be constructed of a single sheet of metal formed into the desired shape. The inside smooth surface of each bowl 24, the inner and outside surfaces of bowl 34 and the surfaces of the trays are preferably coated with one or more nonstick coatings, such as for example TEFLON® (i.e., fluorocarbon polymers), (e.g., tetrafluroethlene and fluorinated ethylene propylene). At least the interior surface of the bowl 24, which contacts the batter or dessert composition, is covered with TEFLON® in the preferred embodiment to ease the removal of the baked or chilled product from the bowl. The radial sloping of the inner wall further eases removal of the final dessert composition. It will be appreciated by those skilled in the art that other shapes and geometries of pan assemblies are possible, and that the specifics of material of which it is made can be changed without departing from scope of the invention. For example, the mold in the tray may be formed as a cone, or other shape. Additionally, it can be stamped from a solid piece of material or spun from aluminum instead of formed from a sheet.

If desired, the trays and associated bowl shaped recesses can be constructed of porous material such as high temperature TEFLON® coated high temperature fiberglass ranging from 5 to 10 mils in thickness or a stainless steel wire cloth also TEFLON® coated on both sides, both of which are breathable an allow an air flow of 50 CFM which vents moisture during baking without batter coming through. The porous material has a sieve opening for the stainless steel wire cloth ranging from 0.0165+or −0.0005 and the stainless steel is STME 1187. The inside and outside surfaces of the bowls and their associated planar surfaces are preferably coated with one or more nonstick coatings, such as for example TEFLON® (i.e., fluorocarbon polymers), (e.g., tetrafluroethlene and fluorinated ethylene propylene). Alternately the sheet and associated bowls can be constructed of sheet steel, stainless steel, copper, aluminum, cast iron, pyrex, glass, porcelain, ceramic or any type of microwaveable material at a uniform desired thickness commonly used for baking pans and containers.

The interior surface and outside surface of the each bowl configuration which contacts the batter or dessert composition is smooth and is covered with TEFLON® in the preferred embodiment to ease the removal of the baked or chilled product from the bowl. The radial sloping of the inner wall of the bowl recess further eases removal of the final dessert composition. It will be appreciated by those skilled in the art that other shapes and geometries of pan assemblies are possible, and that the specifics of material of which it is made can be changed without departing from scope of the invention.

In operation cake batter is poured, about ⅔ to ¾ fill, in each bowl chamber. A second cake batter of a different flavor as for example chocolate is poured in the chambers of bowls in the top sheet about ⅔ to ¾ of the depth of each bowl. The pour line is marked by marking indicia around the interior chamber of the bowl.

After the batter is molded and baked by the application of heat to the trays and their associated bowls the fasteners 40, 60 and 80 depending upon the tray configuration, are released and the top tray 30 removed and taken out of its nesting position in the base tray 22 leaving cavities in each individual cake. The TEFLON® coating of the interior and exterior surface of the inner mold bowl 34 facilitates removal of the mold without tearing or damaging the final baked product. The smaller baked interior cake is then removed from the inner mold bowl body 34, the TEFLON® coating of the interior surface of the inner bowl mold facilitating the dessert removal. The TEFLON® coating of the interior surface of the outer dome mold bowl 24 facilitates removal of the baked product without tearing or damaging the final baked product. The interior cake or other optional filling is then placed in the respective cavity formed by inner mold bowl body 34 of the top tray and the composite assembly is inverted onto a serving area for frosting, icing or other decoration preparatory to being served. The result is a dual domed cake or dessert which is domed shaped as a hemisphere and ready to eat. The baked goods may be filled or coated with ice cream, pudding, icing or other sweet filling for a dessert pastry.

Although aluminum, sheet steel and/or stainless steel is preferred for the concavo-convex outer bowl body, any suitable structural material could be used in its place, as for example, alloyed steel, copper, brass, cast iron or even glass or ceramic, such as stoneware. The inner bowl body has the same structural body as that of the preferred embodiment.

The principles, preferred embodiments and modes of operation of the present invention have been described in the foregoing specification. However; the invention should not be construed as limited to the particular embodiments which have been described above. Instead, the embodiments described here should be regarded as illustrative rather than restrictive. Variations and changes may be made by others without departing from the scope of the present inventions defined by the following claims.

What is claimed is:

1. An apparatus assembly for forming multiple individual compound desserts in a predetermined shape comprising:
    a first rectangularly shaped planar base sheet with a plurality of dome shaped bowls formed therein and extending therefrom, each of said bowls having a closed semi-spherical end and an open end defining a cavity, said planar sheet defining a lip extending around at least a portion of its outer periphery extending upward from its planar surface with at least two linear lip segments being eliminated; and
    a second planar top sheet with a plurality of dome shaped bowls formed therein and extending therefrom, said second sheet being configured to fit within the lip of said base sheet and positioned by said lip, each of said bowls comprising a dome shaped bowl with a closed semi-spherical end and an open end of lesser diameter then a diameter of said bowls of said first sheet and fastening means mounted to said first base sheet and said second top sheet to hold said sheets a fixed spaced relationship so that the bowls of said second top sheet are positioned within respective cavities formed in said first base sheet bowls.

2. An apparatus assembly as claimed in claim 1 for forming compound desserts in a predetermined shape wherein a surface of said first base sheet and associated mold bowls and said second top sheet and associated mold bowls are coated with a nonstick material.

3. An apparatus assembly as claimed in claim 1 for forming compound desserts in a predetermined shape wherein said lip is formed by a rolled end segment.

4. An apparatus assembly as claimed in claim 1 for forming compound desserts in a predetermined shape wherein said lip is a flange extending transverse from a plane of said sheet.

5. An apparatus assembly as claimed in claim 1 for forming compound desserts in a predetermined shape wherein said base sheet is substantially rectangular in shape and said lip only extends around three sides of said rectangular base sheet.

6. An apparatus assembly as claimed in claim 1 for forming compound desserts in a predetermined shape wherein said fastener means is a friction fit member with a head and a shaft and locking means formed on said shaft.

7. An apparatus assembly for forming individual compound dessert in a predetermined shape comprising:
    a substantially rectangular shaped base tray with a plurality of preformed recesses defined by an open end and dome shaped bowls formed therein, each of said bowls having a closed semi-spherical end and an open end defining a cavity, said closed semi-spherical ends of said bowls forming a plane allowing seating of said tray in a stable position, said tray defining a lip structure on its upper surface; and
    a top tray with a plurality of dome shaped bowls formed therein and extending therefrom, each of said top tray bowls comprising a dome shaped bowl with a closed semi-spherical end and an open end of lesser diameter then said bowls of said first tray and slidable fastening means comprising a plurality of slide members mounted to said first base tray and said top tray to hold said trays is a fixed spaced relationship so that the bowls of said top tray are positioned within respective cavities of said base tray bowls.

8. An apparatus assembly as claimed in claim 7 for forming individual compound desserts in a predetermined shape wherein a surface of said base tray and associated mold bowls and said top tray and associated mold bowls are coated with a nonstick material.

9. An apparatus assembly as claimed in claim 7 for forming individual compound desserts in a predetermined shape wherein said lip is formed by a rolled end segment of said tray.

10. An apparatus assembly as claimed in claim 7 for forming individual compound desserts in a predetermined shape wherein said lip is a flange extending transverse from a plane of said tray.

11. An apparatus assembly as claimed in claim 7 for forming individual compound desserts in a predetermined shape wherein said base tray lip has at least two linear segments which are eliminated.

12. An apparatus assembly as claimed in claim 7 for forming individual compound desserts in a predetermined shape wherein an inner surface of said first outer mold bowl and said second inner mold bowl and an outer surface of said second mold bowl are coated with a nonstick material.

13. An apparatus assembly as claimed in claim 8 for forming individual compound desserts in a predetermined shape wherein said nonstick material is tetrafluroethylene.

14. An apparatus assembly as claimed in claim 8 for forming individual compound desserts in a predetermined shape wherein said nonstick material is fluorinated ethylene propylene.

15. An apparatus assembly as claimed in claim 7 for forming individual compound desserts in a predetermined shape wherein said trays are constructed from a group of materials consisting of porous fiberglass, copper aluminum, pyrex, glass, porcelain, ceramic, steel, cast iron, and stainless steel wire cloth.

16. An apparatus assembly for forming individual compound desserts in a predetermined shape comprising:

a substantially rectangular shaped planar base tray with a plurality of shaped structures formed therein, each of said structures defining an open cavity and a closed end, said closed ends of said structures forming a plane allowing seating of said tray in a stable position, said tray defining an integral rolled lip structure on an upper surface to orient a top tray in a predetermined position, said lip extending around only three sides of said base tray; and a top tray with a plurality of shaped structures formed therein and extending therefrom, each of said shaped structures defining a cavity and being sized to fit into a respective cavity of a base tray structure and fastening means mounted to said first base tray and said top tray to hold said trays in a fixed spaced relationship so that the structures of said top tray are positioned within respective cavities of said base tray.

* * * * *